(12) United States Patent
Liu et al.

(10) Patent No.: US 12,474,308 B2
(45) Date of Patent: Nov. 18, 2025

(54) METHOD TO IDENTIFY THE GLYCOSIDIC LINKAGE OF SIALIC ACID IN GLYCOPEPTIDES

(71) Applicant: DH TECHNOLOGIES DEVELOPMENT PTE. LTD., Singapore (SG)

(72) Inventors: Suya Liu, Woodbridge (CA); Takashi Baba, Richmond Hill (CA)

(73) Assignee: DH TECHNOLOGIES DEVELOPMENT PTE. LTD., Singapore (SG)

(*) Notice: Subject to any disclaimer, the term of this patent is extended or adjusted under 35 U.S.C. 154(b) by 423 days.

(21) Appl. No.: 18/002,533

(22) PCT Filed: Jul. 6, 2021

(86) PCT No.: PCT/IB2021/056054
§ 371 (c)(1),
(2) Date: Dec. 20, 2022

(87) PCT Pub. No.: WO2022/009095
PCT Pub. Date: Jan. 13, 2022

(65) Prior Publication Data
US 2023/0251231 A1     Aug. 10, 2023

Related U.S. Application Data

(60) Provisional application No. 63/049,157, filed on Jul. 8, 2020.

(51) Int. Cl.
*G01N 30/72* (2006.01)
*G01N 30/02* (2006.01)
(Continued)

(52) U.S. Cl.
CPC .......... *G01N 30/72* (2013.01); *G01N 30/88* (2013.01); *G01N 30/96* (2013.01); *G01N 33/6848* (2013.01); *G01N 2030/022* (2013.01)

(58) Field of Classification Search
CPC ........ G01N 30/72; G01N 30/88; G01N 30/96; G01N 33/6848; G01N 2030/022
See application file for complete search history.

(56) References Cited

U.S. PATENT DOCUMENTS 8,073,635 B2 * 12/2011 Thomson ............ H01J 49/0009
702/23
2008/0048110 A1    2/2008 Deguchi et al.

FOREIGN PATENT DOCUMENTS

WO    WO-2012082427 A1 *  6/2012 ............ B01D 59/44
WO       2016125060 A1     8/2016

OTHER PUBLICATIONS

International Search Report and Written Opinion for PCT/IB2021/056054, mailed Oct. 21, 2021.
(Continued)

*Primary Examiner* — Benjamin L Lebron
(74) *Attorney, Agent, or Firm* — Potomac Law Group, PLLC; Reza Mollaaghababa; Ido Rabinovitch

(57) ABSTRACT

A separation time of an isomer of one or more isomers of a sialylated glycopeptide of a sample is calculated from a peak of a precursor XIC. Product ion intensities of the first group are summed at the separation time producing a first sum and product ion intensities of the second group are summed at the separation time producing a second sum using XICs of the first and second groups. A ratio of the first sum to the second sum is calculated. The ratio at the separation time is compared to predetermined ratio ranges that each corresponds to a combination of a selection from a set of the first linkage and the second linkage taken one or more times. One (Continued)

or more linkages of the sialic acid to the glycan of the isomer are identified from a combination found to match the ratio in the comparison.

23 Claims, 13 Drawing Sheets

(51) Int. Cl.
*G01N 30/88* (2006.01)
*G01N 30/96* (2006.01)
*G01N 33/68* (2006.01)
*H01J 49/00* (2006.01)
*H01J 49/42* (2006.01)

(56) References Cited

OTHER PUBLICATIONS

Zhang et al. "Recent Advances in Absolute Quantification of Peptides and Proteins using LC-MS," Simultaneous Programming of Two Parameters in Micro- and Capillary-HPLC, vol. 33, No. 1, Feb. 13, 2014, XP055766900, Berlin Germany.
Nilsson Jonas ED—Kanie OSAMU: "Liquid Chromatography-Tandem Mass Spectrometry-Based Fragmentation Analysis of Glycopeptides," Clycoconjugate Journal, Chapman & Hall, Boston, vol. 33, No. 3, Jan. 18, 2016, pp. 261-272, XP035831266.

\* cited by examiner

METHOD TO IDENTIFY THE GLYCOSIDIC LINKAGE OF SIALIC ACID IN GLYCOPEPTIDES

RELATED APPLICATIONS

This application claims the benefit of U.S. Provisional Patent Application Ser. No. 63/049,157, filed on Jul. 8, 2020, the content of which is incorporated by reference herein in its entirety.

INTRODUCTION

The teachings herein relate to operating an electron capture dissociation (ECD) device of a tandem mass spectrometer to identify one or more sialic acid linkages of a glycopeptide. More particularly, the teachings herein relate to systems and methods for identifying one or more linkages of a sialic acid to a glycan of an isomer of a glycopeptide using ECD with an electron energy of 2-5 eV and multiple reaction monitoring (MRM) precursor ion to product ion transitions. The systems and methods disclosed herein can be performed in conjunction with a processor, controller, microcontroller, or computer system, such as the computer system of FIG. 1.

Sialic Linkage Background

Sialylated glycoconjugates are known to play key roles in several pathophysiological processes including viral infection, embryogenesis, inflammation, cardiovascular diseases, cancer, and neural development. The most common mammalian sialic acids comprise different linkages of N-acetylneuraminic acid (Neu5Ac). These linkages include Neu5Ac-alpha (2,6) galactose (Gal) (hereinafter "α2,6") and Neu5Ac-alpha (2,3) Gal (hereinafter "α2,3"). Determining the relative abundances of α2,6 and α2,3 are important in diagnosing the pathophysiological processes just described.

The stereochemistry structural identification in N-glycans or N-glycopeptides of α2,6 and α2,3 is conventionally reported by separation techniques such as capillary electrophoresis (CE) and ion mobility (IMS). Unfortunately, no methods are reported using liquid chromatography coupled mass spectrometry (LC-MS) of non-derivatized glycopeptides by conventional proteomics shotgun sample preparation. The use of LC-MS and shotgun sample preparation (non-derivatized glycopeptides) reduces experimental complexity and increases overall sample throughput. Instead, biochemical identifications employ linkage specific sialic acid derivatization of the glycan before MS. In other words, these techniques generally require chemical conversion of the glycan to a derivative before mass spectrometry (MS).

For example, "High-throughput profiling of protein N-glycosylation by MALDI-TOF-MS employing linkage-specific sialic acid esterification" by Reiding et al. (hereinafter the "Reiding Paper") describes a method for sialic acid stabilization and matrix-assisted laser desorption/ionization (MALDI) time-of-flight (TOF) mass spectrometry (MS) to study glycosylation. The Reiding Paper employs a combination of carboxylic acid activators in ethanol to achieve near-complete ethyl esterification of α2,6 sialic acids and lactonization of α2,3 variants. In other words, the Reiding Paper describes an ethyl esterification chemical conversion of the glycan before MS.

Similarly, "Collisionally activated dissociation and electron capture dissociation provide complementary structural information for branched permethylated oligosaccharides" by Zhao et al. (hereinafter the "Zhao Paper") describes a method to confirm the sequence, branching, and linkage assignments for a glycan. The Zhao Paper is not directed to determining α2,6 and α2,3 linkages. However, the Zhao Paper does describe subjecting glycans to permethylation to increase their sensitivity to collisionally-activated dissociation (CAD) and electron capture dissociation (ECD). In other words, the Zhao Paper describes a permethylation chemical conversion of the glycan before MS. For these glycans, CAD and "hot" ECD provide complementary structural information.

As a result, systems and methods are needed to determine abundances of sialic acid linkages α2,6 and α2,3 of glycopeptides using LC-MS or LC-MS/MS of non-derivatized glycopeptides by conventional proteomics shotgun sample preparation.

Background on Mass Spectrometry Techniques

Mass spectrometers are often coupled with chromatography or other separation systems, such as ion mobility, to identify and characterize eluting known compounds of interest from a sample. In such a coupled system, the eluting solvent is ionized and a series of mass spectra are obtained from the eluting solvent at specified time intervals called retention times. These retention times range from, for example, 1 second to 100 minutes or greater. The series of intensities of an ion of mass spectra measured at the retention times form a chromatogram, or extracted ion chromatogram (XIC).

Peaks found in the XIC are used to identify or characterize a known peptide or compound in the sample. More particularly, the retention times of peaks and/or the area of peaks are used to identify or characterize (quantify) a known peptide or compound in the sample.

In traditional separation coupled mass spectrometry systems, a fragment or product ion of a known compound is selected for analysis. A tandem mass spectrometry or mass spectrometry/mass spectrometry (MS/MS) scan is then performed at each interval of the separation for a mass range that includes the product ion. The intensity of the product ion found in each MS/MS scan is collected over time and analyzed as a collection of spectra, or an XIC, for example.

In general, tandem mass spectrometry, or MS/MS, is a well-known technique for analyzing compounds. Tandem mass spectrometry involves ionization of one or more compounds from a sample, selection of one or more precursor ions of the one or more compounds, fragmentation of the one or more precursor ions into fragment or product ions, and mass analysis of the product ions.

Tandem mass spectrometry can provide both qualitative and quantitative information. The product ion spectrum can be used to identify a molecule of interest. The intensity of one or more product ions can be used to quantitate the amount of the compound present in a sample.

A large number of different types of experimental methods or workflows can be performed using a tandem mass spectrometer. Three broad categories of these workflows are targeted acquisition, information dependent acquisition (IDA) or data-dependent acquisition (DDA), and data-independent acquisition (DIA).

In a targeted acquisition method, one or more transitions of a precursor ion to a product ion are predefined for a compound of interest. As a sample is being introduced into the tandem mass spectrometer, the one or more transitions are interrogated or monitored during each time period or cycle of a plurality of time periods or cycles. In other words, the mass spectrometer selects and fragments the precursor ion of each transition and performs a targeted mass analysis only for the product ion of the transition. As a result, an intensity (a product ion intensity) is produced for each transition. Targeted acquisition methods include, but are not limited to, multiple reaction monitoring (MRM) and selected reaction monitoring (SRM).

Multiple Reaction Monitoring (MRM) on triple quadrupole based instrumentation is the standard mass spectrometric technique of choice for targeted MS quantification in all application areas, due to its ability to provide the highest specificity and sensitivity for the detection of specific components in complex mixtures. However, the speed and sensitivity of today's accurate mass MS systems have enabled a new quantification strategy with similar performance characteristics. In this strategy (termed MRM-HR workflow or parallel reaction monitoring, PRM), looped MS/MS spectra are collected at high-resolution with short accumulation times, and then fragment ions are extracted post-acquisition to generate MRM-like peaks for integration and quantification. With instrumentation like the TRIPLETOF® Systems, this targeted technique is sensitive and fast enough to enable quantitative performance similar to higher end triple quadrupole instruments, with full fragmentation data measured at high resolution and high mass accuracy.

In an IDA method, a user can specify criteria for performing an untargeted mass analysis of product ions, while a sample is being introduced into the tandem mass spectrometer. For example, in an IDA method, a precursor ion or mass spectrometry (MS) survey scan is performed to generate a precursor ion peak list. The user can select criteria to filter the peak list for a subset of the precursor ions on the peak list. MS/MS is then performed on each precursor ion of the subset of precursor ions. A product ion spectrum is produced for each precursor ion. MS/MS is repeatedly performed on the precursor ions of the subset of precursor ions as the sample is being introduced into the tandem mass spectrometer.

In proteomics and many other sample types, however, the complexity and dynamic range of compounds are very large. This poses challenges for traditional targeted and IDA methods, requiring very high-speed MS/MS acquisition to deeply interrogate the sample in order to both identify and quantify a broad range of analytes.

As a result, DIA methods, the third broad category of tandem mass spectrometry, were developed. These DIA methods have been used to increase the reproducibility and comprehensiveness of data collection from complex samples. DIA methods can also be called non-specific fragmentation methods. In a traditional DIA method, the actions of the tandem mass spectrometer are not varied among MS/MS scans based on data acquired in a previous precursor or product ion scan. Instead, a precursor ion mass range is selected. A precursor ion mass selection window is then stepped across the precursor ion mass range. All precursor ions in the precursor ion mass selection window are fragmented and all of the product ions of all of the precursor ions in the precursor ion mass selection window are mass analyzed.

The precursor ion mass selection window used to scan the mass range can be very narrow so that the likelihood of multiple precursors within the window is small. This type of DIA method is called, for example, MS/MS$^{ALL}$. In an MS/MS$^{ALL}$ method, a precursor ion mass selection window of about 1 amu is scanned or stepped across an entire mass range. A product ion spectrum is produced for each 1 amu precursor mass window. The time it takes to analyze or scan the entire mass range once is referred to as one scan cycle. Scanning a narrow precursor ion mass selection window across a wide precursor ion mass range during each cycle, however, is not practical for some instruments and experiments.

As a result, a larger precursor ion mass selection window, or selection window with a greater width, is stepped across the entire precursor mass range. This type of DIA method is called, for example, SWATH acquisition. In a SWATH acquisition, the precursor ion mass selection window stepped across the precursor mass range in each cycle may have a width of 5-25 amu, or even larger. Like the MS/MS$^{ALL}$ method, all the precursor ions in each precursor ion mass selection window are fragmented, and all of the product ions of all of the precursor ions in each mass selection window are mass analyzed.

Fragmentation Techniques Background

Electron-based dissociation (ExD), ultraviolet photodissociation (UVPD), infrared photodissociation (IRMPD) and collision-induced dissociation (CID) or CAD are often used as fragmentation techniques for tandem mass spectrometry (MS/MS). ExD can include, but is not limited to, ECD or electron transfer dissociation (ETD). CID is the most conventional technique for dissociation in tandem mass spectrometers.

As described above, in top-down and middle-down proteomics, an intact or digested protein is ionized and subjected to tandem mass spectrometry. ECD, for example, is a dissociation technique that dissociates peptide and protein backbones preferentially. As a result, this technique is an ideal tool to analyze peptide or protein sequences using a top-down and middle-down proteomics approach.

SUMMARY

A system, method, and computer program product are disclosed for identifying one or more linkages of a sialic acid to a glycan of an isomer of a glycopeptide using ECD and MRM precursor ion to product ion transitions, in accordance with various embodiments. The system includes a separation device, an ion source, a tandem mass spectrometer, and a processor.

The separation device separates one or more isomers of a glycopeptide from a sample. The ion source ionizes the one or more separated isomers, producing an ion beam that includes isomer ions of a precursor ion of the glycopeptide.

The tandem mass spectrometer includes an ECD device. For each separation time of a plurality separation times, the tandem mass spectrometer executes or monitors a first and a second group of MRM transitions using the ECD device with an electron energy of 2-5 eV. The first group of one or more MRM transitions is selected so that each transition includes the precursor ion and a product ion known to be enhanced or suppressed for a first linkage of a sialic acid of the glycopeptide to a glycan. The second group of one or more MRM transitions is selected so that each transition includes the precursor ion and a product ion known to be enhanced or suppressed for a second linkage of the sialic acid of the glycopeptide to the glycan. In various embodiments, MRM-HR can be used to monitor all product ions simultaneously. An XIC is produced for the precursor ion. An XIC is produced for each product ion of the first and second groups.

The processor performs a number of steps. The processor calculates a separation time of an isomer of the one or more separated isomers from a peak of the XIC. The processor sums product ion intensities of the first group at the separation time producing a first sum and sums product ion intensities of the second group at the separation time producing a second sum using XICs of the first and second groups. The processor calculates a ratio of the first sum to the second sum. The processor compares the ratio at the separation time to predetermined ratio ranges that each corresponds to a combination of a selection from a set of the first linkage and the second linkage taken one or more times. The one or more times correspond to the number of one or more sialic acids known to be included in the glycopeptide. Finally, the processor identifies one or more linkages of the sialic acid to the glycan of the isomer from the combination found to match the ratio in the comparison.

These and other features of the applicant's teachings are set forth herein.

BRIEF DESCRIPTION OF THE DRAWINGS

The skilled artisan will understand that the drawings, described below, are for illustration purposes only. The drawings are not intended to limit the scope of the present teachings in any way.

Figure 1:
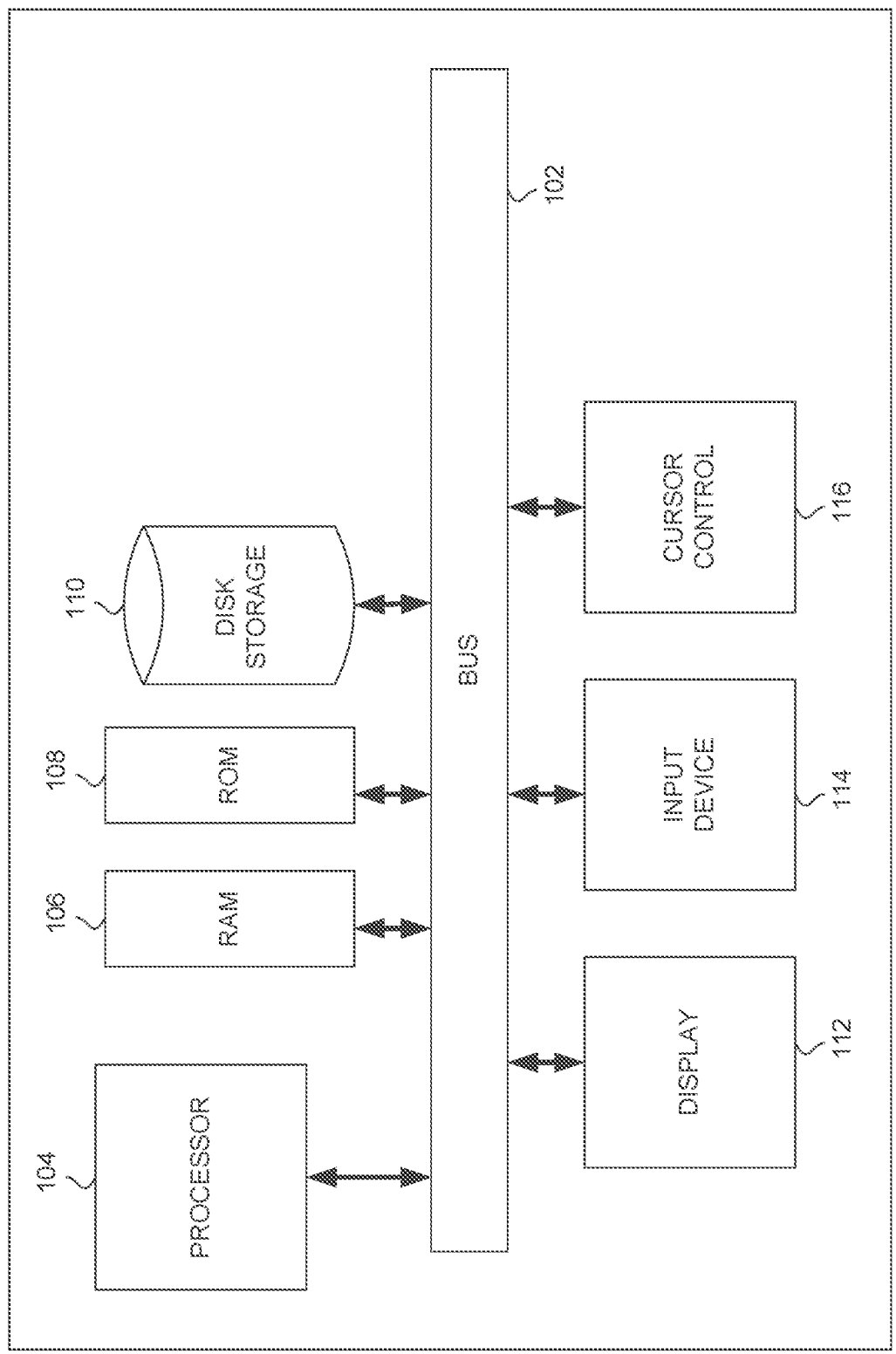
FIG. 1 is a block diagram that illustrates a computer system, upon which embodiments of the present teachings may be implemented.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random-access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively, hard-wired circuitry may be used in place of or in combination with software instructions to implement the present teachings. Thus, implementations of the present teachings are not limited to any specific combination of hardware circuitry and software.

In various embodiments, computer system 100 can be connected to one or more other computer systems, like computer system 100, across a network to form a networked system. The network can include a private network or a public network such as the Internet. In the networked system, one or more computer systems can store and serve the data to other computer systems. The one or more computer systems that store and serve the data can be referred to as servers or the cloud, in a cloud computing scenario. The one or more computer systems can include one or more web servers, for example. The other computer systems that send and receive data to and from the servers or the cloud can be referred to as client or cloud devices, for example.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as memory 106. Transmission media includes coaxial cables, copper wire, and fiber optics, including the wires that comprise bus 102.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Identifying Isomers with Different Sialic Acid Linkages

As described above, determining the relative abundances of $\alpha 2,6$ and $\alpha 2,3$ are important in diagnosing pathophysiological processes including, but not limited to, viral infection, embryogenesis, inflammation, cardiovascular diseases, cancer, and neural development. The stereochemistry structural identification in N-glycans or N-glycopeptides of $\alpha 2,6$ and $\alpha 2,3$ is conventionally reported by separation techniques such as CE and IMS. Unfortunately, no methods are reported using LC-MS or LC-MS/MS of non-derivatized glycopeptides by conventional proteomics shotgun sample preparation. The use of LC-MS and shotgun sample preparation (non-derivatized glycopeptides) reduces experimental complexity and increases overall sample throughput.

As a result, systems and methods are needed to determine abundances of sialic acid linkages $\alpha 2,6$ and $\alpha 2,3$ of glycopeptides using LC-MS or LC-MS/MS of non-derivatized glycopeptides by conventional proteomics shotgun sample preparation.

In various embodiments, isomers of a glycopeptide with different combinations of linkages $\alpha 2,6$ and $\alpha 2,3$ for the sialic acids of the glycopeptide are identified using LC-MS/MS. The isomers are separated using LC. Groups of MRM transitions targeting linkages $\alpha 2,6$ and $\alpha 2,3$ are monitored using ECD with an electron energy between 2-5 eV as the isomers are eluting. A ratio of the intensities measured from the two different groups of transitions is used to identify the sialic linkages of the isomers as $\alpha 2,6$ or $\alpha 2,3$. The relative abundances or quantities of the isomers with different sialic linkages are then used to diagnose pathophysiological processes.

A glycopeptide, for example, is a peptide that includes a glycan. A glycan is, for example, a carbohydrate or complex sugar. Glycans are known to attach to cell surface receptor proteins or extracellular proteins such as antibodies and have a large variety of specific biological functions. A peptide backbone is a sequence of amino acids. If a glycan is attached to the amino acid asparagine (N) of a peptide backbone, the peptide is referred to as an N-glycopeptide.

Figure 2:
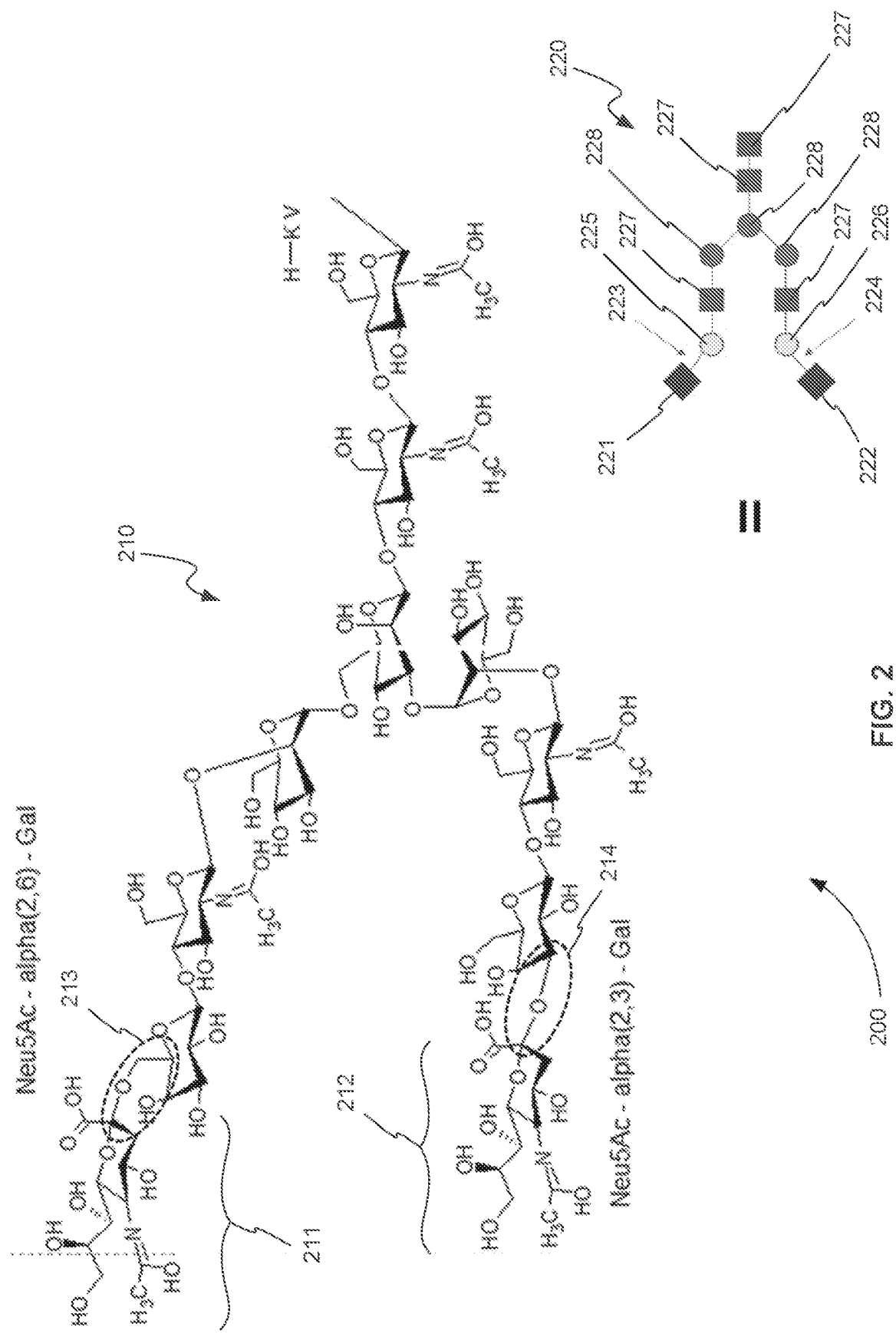
FIG. 2 is an exemplary diagram showing a structural formula and an Oxford system notation for a glycan that includes two sialic acids that each has a different sialic acid to sugar linkage, in accordance with various embodiments.

FIG. 2 is an exemplary diagram 200 showing a structural formula and an Oxford system notation for a glycan that includes two sialic acids that each has a different sialic acid to sugar linkage, in accordance with various embodiments. In FIG. 2, structural formula 210 shows a sialic acid, Neu5Ac 211, connected at the end of one antenna of the glycan and another sialic acid, Neu5Ac 212, connected at the end of another antenna of the glycan. Neu5Ac 211 is connected to a Gal of the glycan through $\alpha 2,6$ linkage 213. Neu5Ac 212 is connected to a Gal of the glycan through $\alpha 2,3$ linkage 214.

Equivalently, Oxford system notation 220 shows Neu5Ac 221 connected at the end of one antenna of the glycan and Neu5Ac 222 connected at the end of another antenna of the glycan. Neu5Ac 221 is connected to Gal 225 of the glycan through $\alpha 2,6$ linkage 223. Neu5Ac 222 is connected to Gal 226 of the glycan through $\alpha 2,3$ linkage 224. In Oxford system notation 220, $\alpha 2,6$ linkage 223 and $\alpha 2,3$ linkage 224 are bent in different directions with respect to their antenna to show that they are different linkages. At the end of the glycan opposite Neu5Ac 221 and Neu5Ac 222, the glycan is connected or attached to the backbone of a peptide (not shown), for example.

Other components of the glycan include Mannose (Man) 227 and N-Acetylglucosamine (GlcNAc) 228. Gal 225, Gal 226, and Man 227 are types of hexose. GlcNAc 228 and N-Acetylgalactosamine (GalNAc) are types of hexNAc. In FIG. 2, the sialic acids are shown as Neu5Ac 221 and Neu5Ac 222. In various alternative embodiments, the sialic acids can be, but are not limited to, N-Glycolylneuraminic acid (Neu5Gc, or Sg). Humans, for example, do not have Sg.

In various embodiments, glycopeptides, such as N-glycopeptides are found from digested proteins and are separated by LC. For example, LC separation methods for glycopeptides include, but are not limited to, reversed-phase LC and non-reversed hydrophilic interaction liquid chromatography (HILIC).

Figure 3:
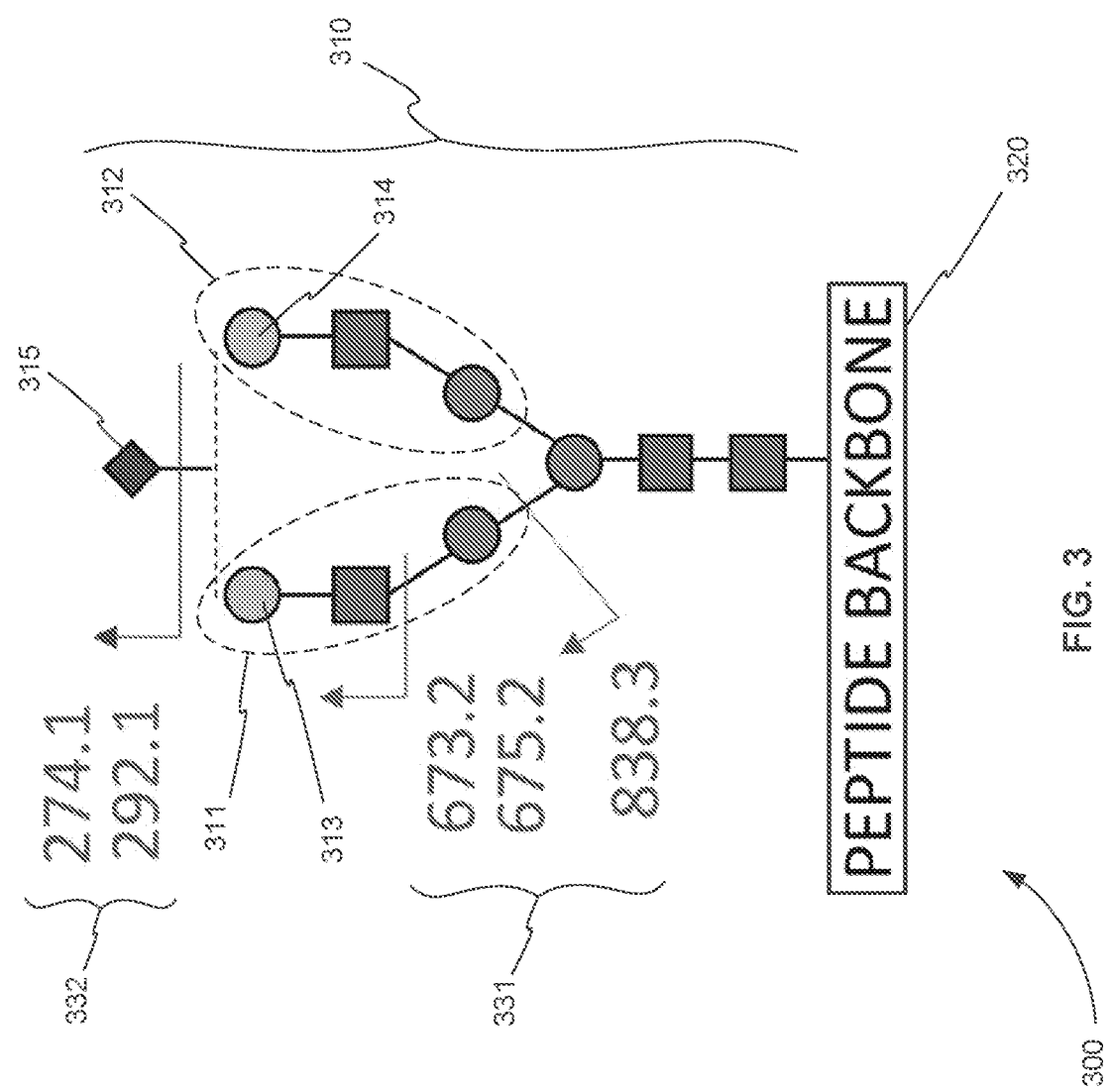
FIG. 3 is an exemplary diagram showing a glycan with one sialic acid attached to a peptide backbone forming a glycopeptide, in accordance with various embodiments.

FIG. 3 is an exemplary diagram 300 showing a glycan with one sialic acid attached to a peptide backbone forming a glycopeptide, in accordance with various embodiments. In FIG. 3, glycan 310 is attached at one end to peptide backbone 320. As described above, peptide backbone 320 is made up of a series of one or more amino acids. Glycan 310 includes two antennae 311 and 312, two Gal sugars 313 and 314, and one sialic acid Neu5Ac 315. A glycopeptide with the configuration of glycan 310 is sometimes referred to as an A2G2Sa1 glycopeptide, referring to two antennae, two Gal sugars, and one sialic acid, respectively.

Glycan 310 has only one sialic acid Neu5Ac 315 and, therefore, represents the simplest case. In FIG. 3, the linkage of Neu5Ac 315 to Gal sugars 313 and 314 is not shown as bent to the left or the right. As a result, it does not depict either of the two possible linkages $\alpha2,6$ or $\alpha2,3$.

In various embodiments, in order to determine the linkage of Neu5Ac 315 to Gal sugars 313 and 314, the glycopeptide of FIG. 3 is subjected to MS as it is eluting from the LC column. The m/z of the glycopeptide is 914.4, for example. From the MS, a precursor XIC of the glycopeptide is obtained.

Figure 4:
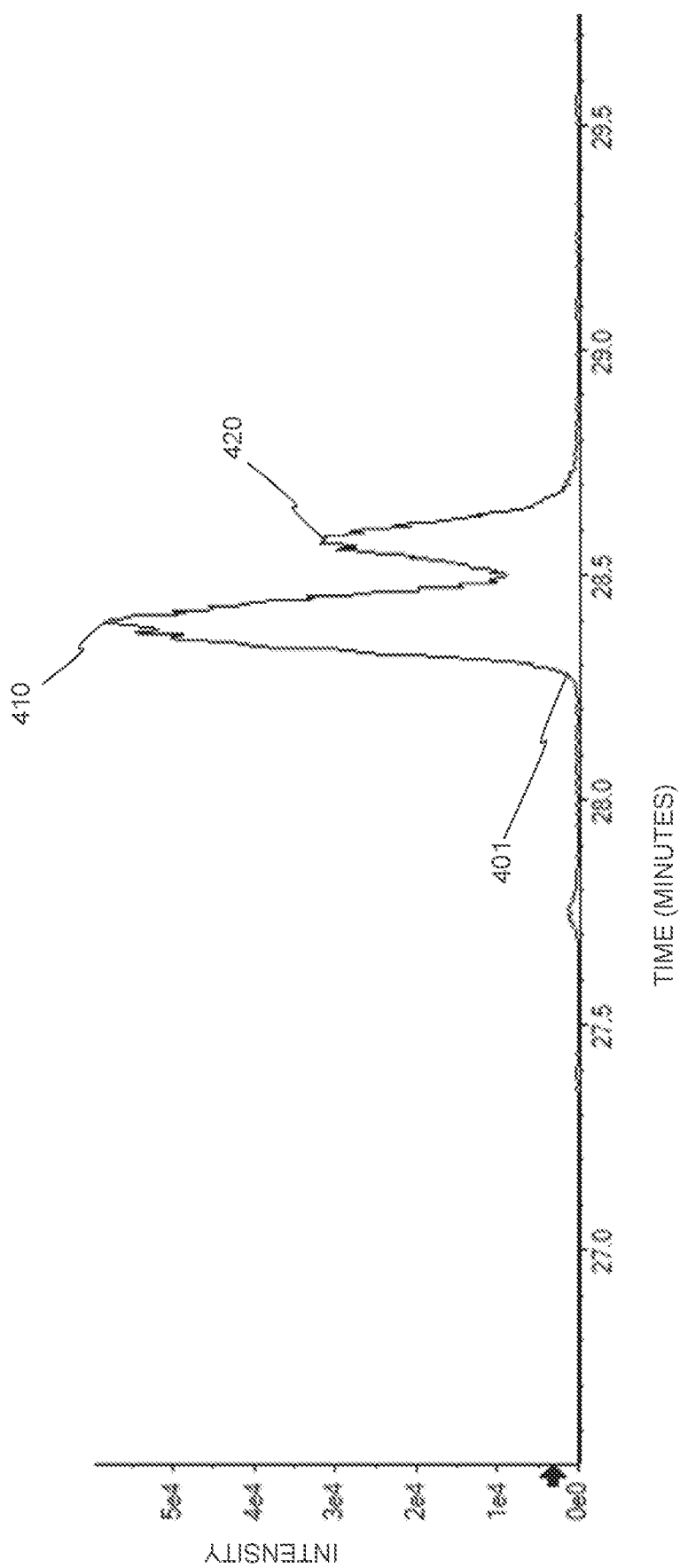
FIG. 4 is an exemplary plot of a precursor XIC from MS of the glycopeptide of FIG. 3, in accordance with various embodiments.

FIG. 4 is an exemplary plot 400 of a precursor XIC from MS of the glycopeptide of FIG. 3, in accordance with various embodiments. Precursor XIC 401 includes two precursor ion peaks 410 and 420 for the glycopeptide of FIG. 3. Peaks 410 and 420 in FIG. 4 represent isomers of the glycopeptide. In other words, they have the same m/z of 914.4 but a different structure. Specifically, peaks 410 and 420 represent different linkages of Neu5Ac 315 to Gal sugars 313 and 314 in FIG. 3. In other words, returning to FIG. 4, one of peaks 410 and 420 in FIG. 4 represent an $\alpha2,6$ linkage and the other peak represents an $\alpha2,3$ linkage.

Conventionally, as described above in reference to the Reiding Paper and the Zhao Paper, it was not thought possible to distinguish $\alpha2,6$ and $\alpha2,3$ linkages without employing linkage specific sialic acid derivatization of the glycan before MS. More broadly, it was known that ExD and CID are complementary for glycopeptide analysis. However, it was generally thought that ExD, or ECD specifically, works on the peptide backbone in glycopeptides and CID works on glycans in glycopeptides, although ECD has been shown to work on free glycans also. In general, it was known that "low" ECD (0-2 eV) and ETD do not provide good dissociation efficiency and "hot" ECD (5-10 eV) is better for more complex glycans. The Zhao Paper, for example, describes that hot ECD on a doubly charged disialyated glycan is not useful. In contrast, the Zhao Paper reports that hot ECD provides more structural information than CID for larger complex glycans.

In various embodiments, experimentation shows that ECD with an electron energy between 2 and 5 eV, preferably 3 eV, produces detectable fragments of glycans in glycopeptides. These fragments are then used to distinguish between $\alpha2,6$ and $\alpha2,3$ sialic acid linkages of the glycans.

Returning to FIG. 3, two groups of fragment or product ions 331 and 332 for the glycan of the glycopeptide of FIG. 3 are shown. When this glycopeptide (914.4 m/z) is fragmented using ECD with an electron energy of 3 eV, group 331 product ions are found to be enhanced for $\alpha2,6$ sialic acid linkages and group 332 product ions are found to be suppressed for $\alpha2,6$ sialic acid linkages. Conversely, under the same conditions, group 331 product ions are found to be suppressed for $\alpha2,3$ sialic acid linkages and group 332 product ions are found to be enhanced for $\alpha2,3$ sialic acid linkages. In other words, using ECD with an electron energy of 3 eV, $\alpha2,6$ and $\alpha2,3$ sialic acid linkages can be identified by comparing the intensities of different groups of product ions.

Figure 5:
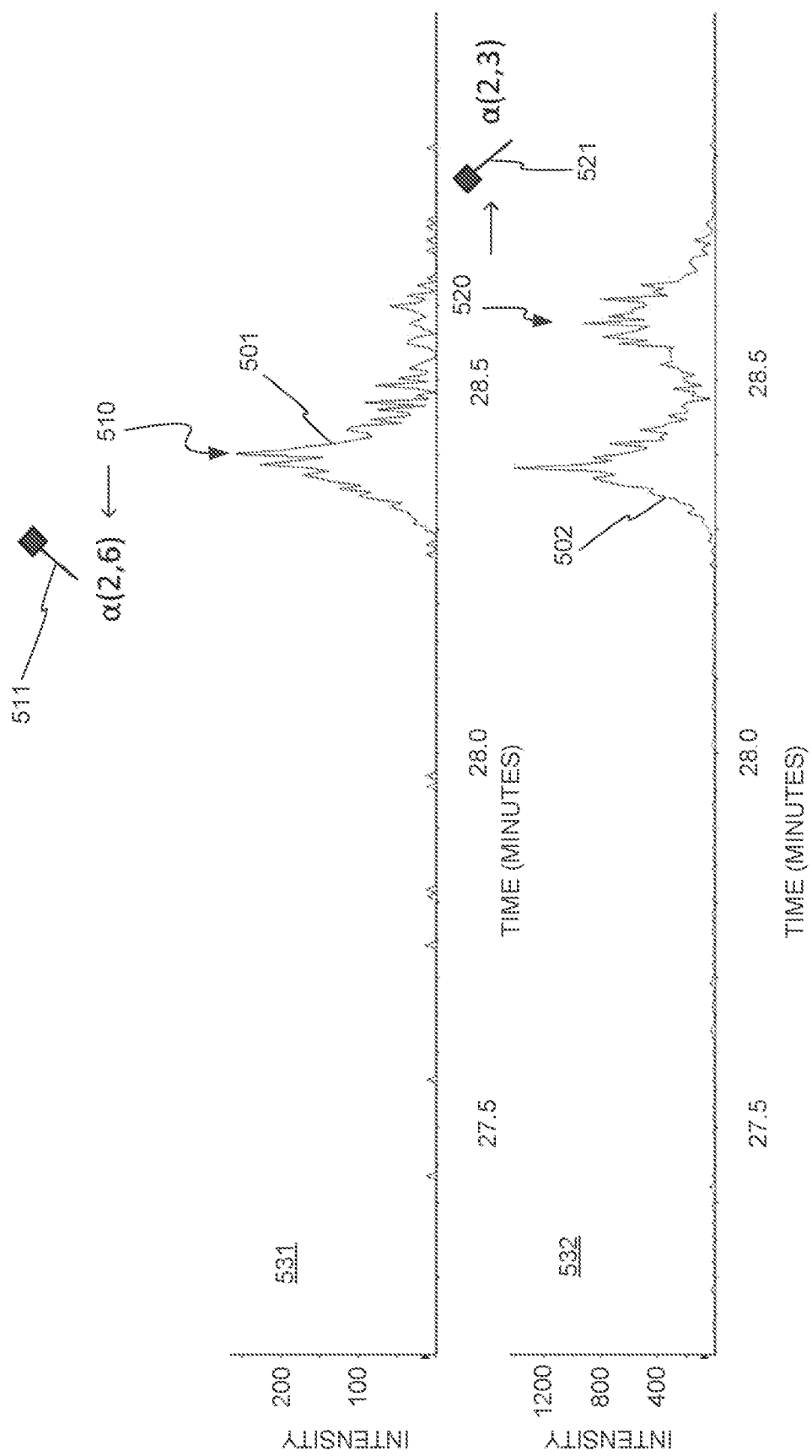
FIG. 5 is an exemplary series of plots of two XICs measured for two different groups of MRM transitions developed for the glycopeptide of FIG. 3 and monitored using ECD with an electron energy of 3 eV, in accordance with various embodiments.

FIG. 5 is an exemplary series 500 of plots of two XICs measured for two different groups of MRM transitions developed for the glycopeptide of FIG. 3 and monitored using ECD with an electron energy of 3 eV, in accordance with various embodiments. XIC 501 in plot 531 represents a sum of the intensities measured for three MRM transitions 914.4 to 676.5, 677.5, and 678.5 m/z measured over a series of LC separation times. XIC 502 in plot 532 represents a sum of the intensities measured for three MRM transitions 914.4 to 292.1, 293.1, and 294.1 m/z measured over a series of LC separation times.

Both XIC 501 and XIC 502 produce product ion peaks at times 510 and 520 corresponding to precursor ion peaks 410 and 420 of FIG. 4. However, returning to FIG. 5, XIC 501 and XIC 502 have very different relative intensities at times 510 and 520. For example, at time 510, both XIC 501 and XIC 502 have similar intensities. At time 520, however, XIC 502 has a much larger intensity than XIC 501.

The differences in the relative intensities of these groups of product ions for different isomers of the precursor ion show that the relative intensities of these groups of product ions can be used to identify linkages of isomers. For example, as described above, the intensities of the product ions of the transitions producing XIC 501 are known to be suppressed for $\alpha2,3$ sialic acid linkages and the product ions of the transitions producing XIC 502 are known to be enhanced for $\alpha2,3$ sialic acid linkages. At time 520, the intensity of XIC 502 is much greater than the intensity of XIC 501. As a result, the isomer of the precursor ion at time 520 has an $\alpha2,3$ sialic acid linkage 521.

Conversely, as described above, the intensities of the product ions of the transitions producing XIC 501 are known to be enhanced for $\alpha2,6$ sialic acid linkages and the product ions of the transitions producing XIC 502 are known to be suppressed for $\alpha2,6$ sialic acid linkages. At time 510, the intensity of XIC 502 is the same or slightly less than the intensity of XIC 501. As a result, the isomer of the precursor ion at time 510 has an $\alpha2,6$ sialic acid linkage 511.

Consequently, FIG. 5 shows how a comparison of the relative intensities of two groups of one or more MRM transitions monitored using ECD with an electron energy of 3 eV can be used to distinguish peaks of precursor ion isomers and, in turn, precursor ion peaks with different sialic acid linkages. Abundances or quantities of the precursor ions with different sialic acid linkages calculated from their peaks can then be used to diagnose different pathophysiological processes.

One of ordinary skill in the art understands that a comparison of relative intensities of two groups is equivalent to a calculation of a ratio of the intensities of the two groups. Similarly, one of ordinary skill in the art understands that a comparison of abundances or quantities of two precursor ions is also equivalent to calculating a ratio of the quantities of the two precursor ions.

FIGS. 3-5 relate to a glycopeptide with a single sialic acid in a two-antenna typed N glycan and, therefore, a single sialic acid linkage. In various embodiments, isomers of glycopeptides with two or more sialic acids in two-four antenna type N glycans and sialic acid linkages are identified similarly. However, these isomers are identified based on a combination of two or more sialic acid linkages selected from the set of α2,6 and α2,3 sialic acid linkages.

Figure 6:
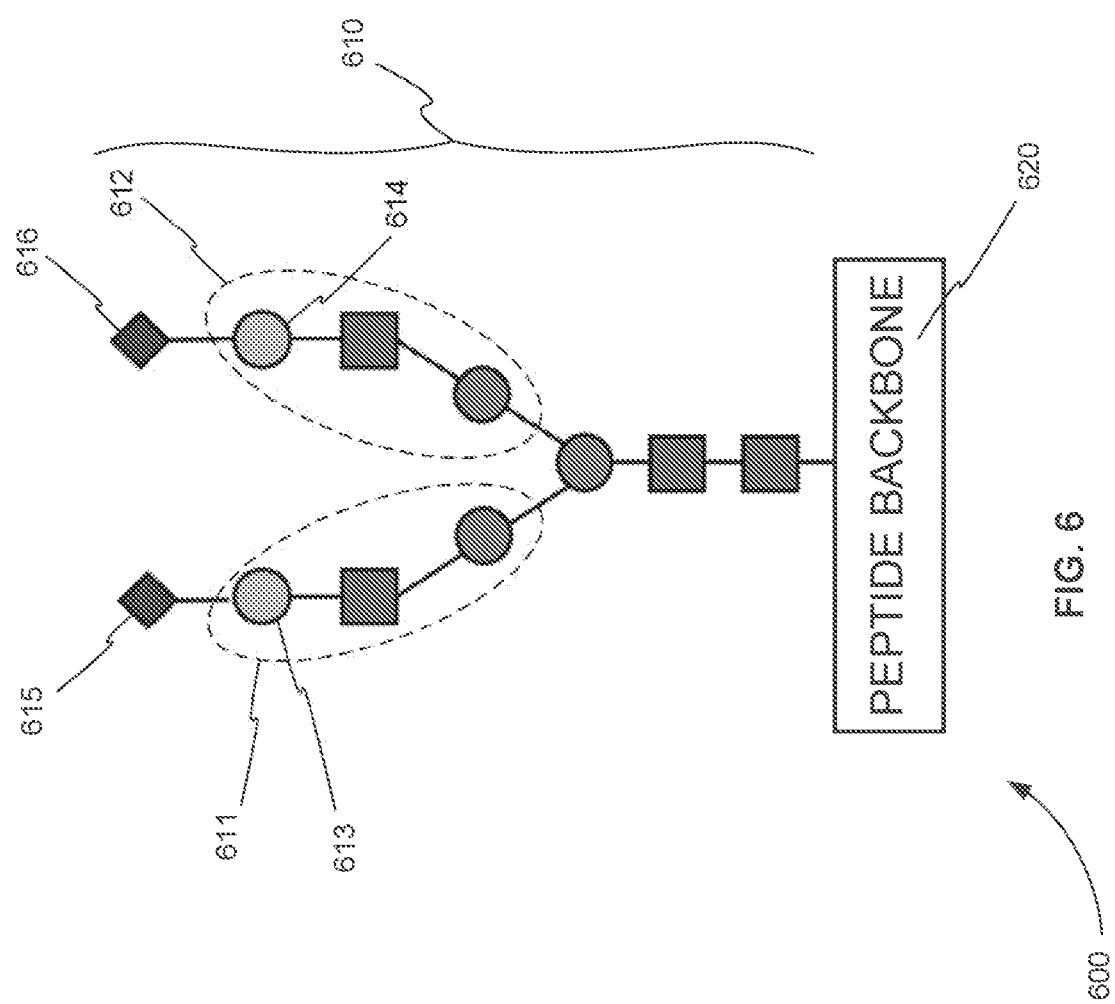
FIG. 6 is an exemplary diagram showing a glycan with two sialic acid attached to a peptide backbone forming a glycopeptide, in accordance with various embodiments.

FIG. 6 is an exemplary diagram 600 showing a glycan with two sialic acids attached to a peptide backbone forming a glycopeptide, in accordance with various embodiments. In FIG. 6, glycan 610 is attached at one end to peptide backbone 620. Glycan 610 includes two antennae 611 and 612, two Gal sugars 613 and 614, and two sialic acids Neu5Ac 615 and 616. A glycopeptide with the configuration of glycan 610 is referred to as an A2G2Sa2 glycopeptide, referring to two antennae, two Gal sugars, and two Neu5Ac type sialic acids, respectively.

In various embodiments, to determine the linkage of Neu5Ac 615 to Gal sugar 613 and the linkage of Neu5Ac 616 to Gal sugar 614 of each isomer, the isomers of the glycopeptide of FIG. 6 are subjected to MS as they are eluting from the LC column. The m/z of the precursor ion of the glycopeptide is 987.2, for example. From the MS, a precursor XIC of the glycopeptide is obtained.

Figure 7:
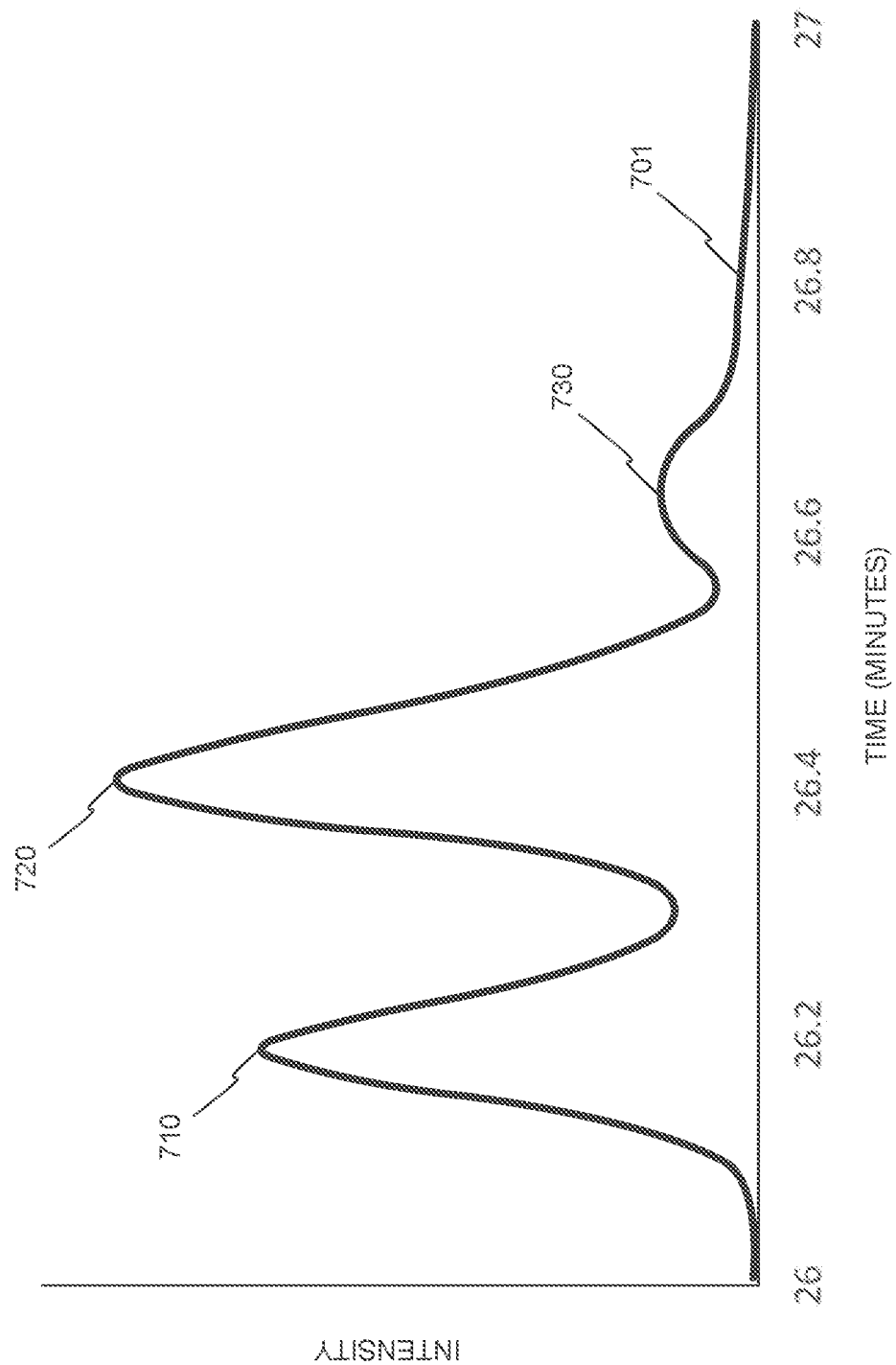
FIG. 7 is an exemplary plot of a precursor XIC from MS of the glycopeptide of FIG. 6, in accordance with various embodiments.

FIG. 7 is an exemplary plot 700 of a precursor XIC from MS of the glycopeptide of FIG. 6, in accordance with various embodiments. Precursor XIC 701 includes three precursor ion peaks 710, 720, and 730 representing at least three isomers of the precursor ion. Because the glycopeptide includes two sialic acids, peaks 710, 720, and 730 are known to represent three different combinations of two selections from the set of α2,6 and α2,3 sialic acid linkages. More specifically, the three peaks represent the combinations (α2,6, α2,6), (α2,6, α2,3), and (α2,3, α2,3). To identify each peak with its combination of sialic acid linkages, two groups of product ions for the glycan of the glycopeptide of FIG. 6 are selected and monitored using ECD with an electron energy of 3 eV.

Figure 8:
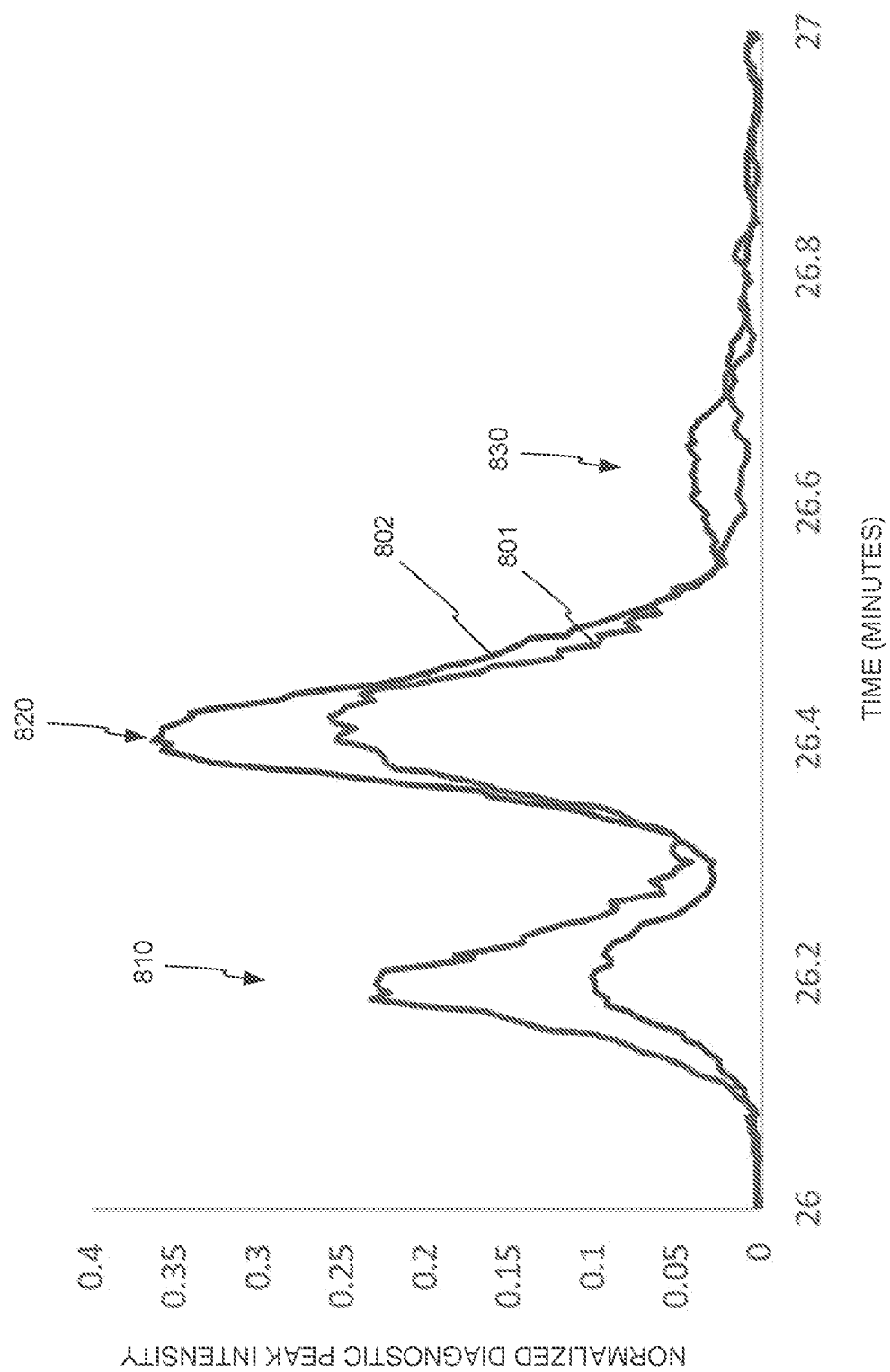
FIG. 8 is an exemplary plot of two XICs measured for two different groups of MRM transitions developed for the glycopeptide of FIG. 6 and monitored using ECD with an electron energy of 3 eV, in accordance with various embodiments.

FIG. 8 is an exemplary plot 800 of two XICs measured for two different groups of MRM transitions developed for the glycopeptide of FIG. 6 and monitored using ECD with an electron energy of 3 eV, in accordance with various embodiments. XIC 801 represents a sum of the intensities measured for two MRM transitions 987.2 to 675 and 838 m/z over a series of LC separation times. XIC 802 represents a sum of the intensities measured for two MRM transitions 987.2 to 274 and 292 m/z over a series of LC separation times. MRM transitions 987.2 to 675 and 838 m/z show a similar behavior as the $1^{st}$ group for sialic acid linkage diagnostics, and MRM transitions 987.2 to 274 and 292 m/z show a similar behavior as the $2^{nd}$ group for sialic acid linkage diagnostics, so two peak intensities in the same group can be summed to increase the signal-to-noise ratio.

Both XIC 801 and XIC 802 produce product ion peaks at times 810, 820, and 830 corresponding to precursor ion peaks 710, 720, and 730 of FIG. 7. However, returning to FIG. 8, XIC 801 and XIC 802 have very different relative intensities at times 810, 820, and 830. The differences in the relative intensities of these groups of product ions for different isomers of the precursor ion show that the relative intensities of these groups of product ions can be used to identify each isomer of the glycopeptide. In various embodiments, these differences in the relative intensities of these groups are expressed as a ratio and can be plotted as a function of the separation time.

Figure 9:
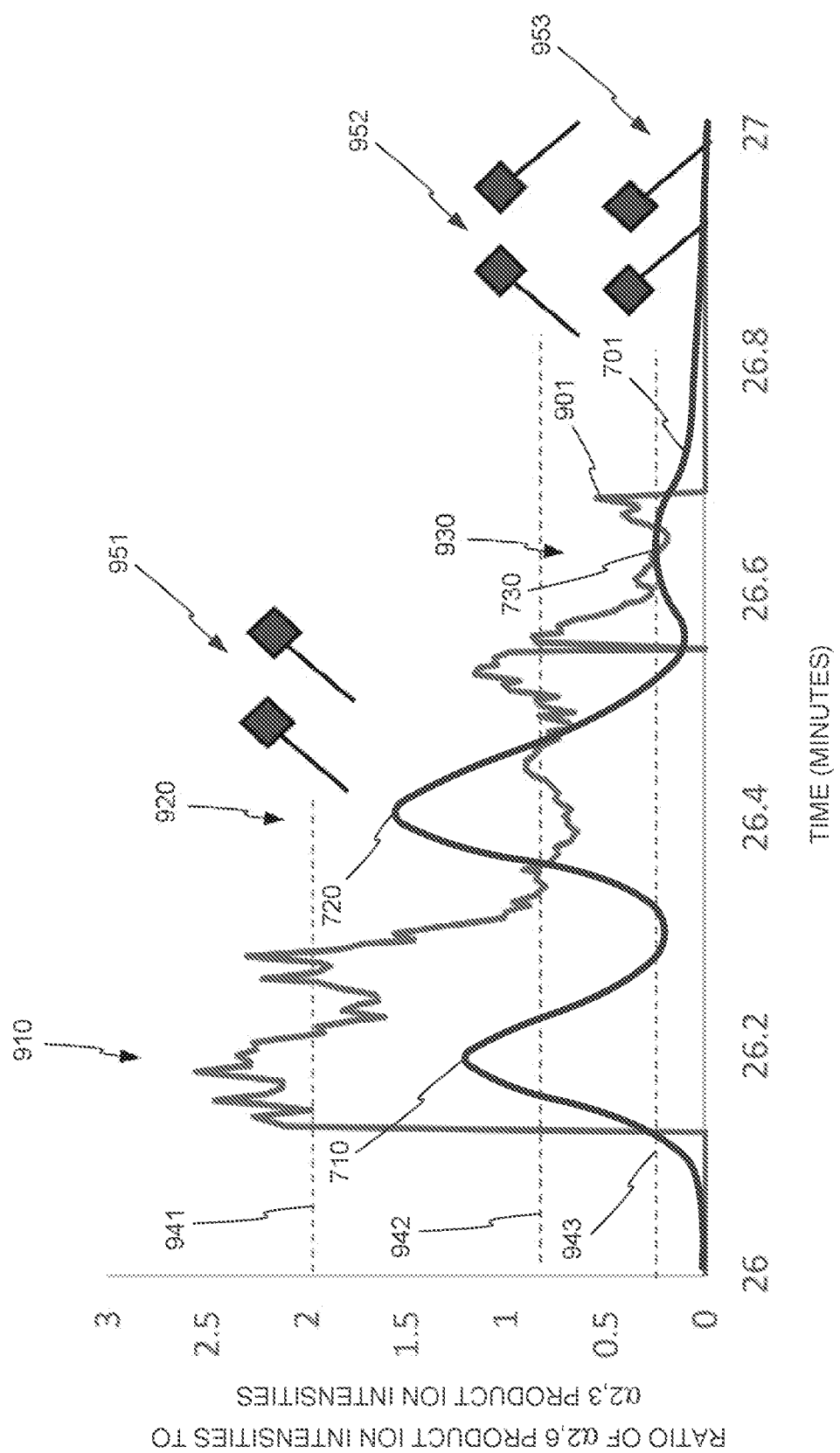
FIG. 9 is an exemplary plot of the precursor XIC of FIG. 7 superimposed on the ratio of the intensities of the two XICs of FIG. 8, in accordance with various embodiments.

FIG. 9 is an exemplary plot 900 of the precursor XIC of FIG. 7 superimposed on the ratio of the intensities of the two XICs of FIG. 8, in accordance with various embodiments. Ratio 901 is the running or moving average of the sum of intensities from the two MRM transitions 987.2 to 675 and 838 m/z (enhanced by α2,6 linkages) divided by the running or moving average of the sum of intensities from the two MRM transitions 987.2 to 274 and 292 (enhanced by α2,3 linkages). A moving average is used, for example, to smooth the intensities. However, a moving average is not mandatory.

Precursor XIC 701 is superimposed on ratio 901 to show how ratio 901 is used to identify the linkages of each peak of precursor XIC 701. For example, the apex of precursor ion peak XIC of precursor XIC 701 is used to calculate a separation time 910 of a first isomer of the glycopeptide. Ratio 901, at separation time 910, is compared to predetermined ratio ranges or thresholds 941, 942, and 943. Each range or threshold corresponds to a combination of a selection from the set of α2,6 and α2,3 sialic acid linkages taken one or more times. Selecting from the set one or more times correspond to the number of one or more sialic acids known to be included in the glycopeptide. The number of sialic acids is known from the m/z of the glycopeptide, for example.

In this case, the glycopeptide includes two sialic acids, so the selections are taken twice, meaning that each combination is a group of two sialic acid linkages. Specifically, ranges or thresholds 941, 942, and 943 correspond to linkage combinations (α2,6, α2,6) 951, (α2,6, α2,3) 952, and (α2,3, α2,3) 953, respectively.

At separation time 910, ratio 901 is near 2.0 and in range 941 corresponding to combination (α2,6, α2,6) 951. In other words, the comparison of ratio 901 at separation time 910 to predetermined ratio ranges 941, 942, and 943 produces a match with combination (α2,6, α2,6) 951. As a result, the first isomer, which is represented by peak 710 of precursor XIC 701, is found to include two α2,6 sialic acid linkages.

Similarly, the second isomer represented by peak 720 of precursor XIC 701 and found at separation time 920 is identified and found to include one α2,6 sialic acid linkage and one α2,3 sialic acid linkage (combination 952). The third isomer represented by peak 730 of precursor XIC 701 and found at separation time 930 is identified and found to include two α2,3 sialic acid linkages (combination 953).

In various embodiments, a quantity, a maximum intensity, or some other feature of the precursor ion peaks of at least two isomers of the glycopeptide are calculated and compared to provide, a diagnosis of a pathophysiological process. For example, the quantity of the first isomer represented by peak 710 is compared to the quantity of the second isomer represented by peak 720. In other words, a ratio of the two quantities is calculated. Using this quantity ratio and the identified combination of sialic acid linkages included by each isomer a diagnosis of a pathophysiological process is provided. The diagnosis is provided, for example, by using a set of rules relating the quantity ratio and combination of sialic acid linkages to one or more pathophysiological processes.

In various embodiments, CID is used in addition to ECD to identify one or more linkages of a sialic acid to a sugar of an isomer other than Gal. For example, using CID, a group of one or more MRM transitions are monitored, producing an XIC for each transition of the group. The transitions of the group are known to fragment linkages of a sialic acid to a sugar other than Gal. These linkages are then identified from the XICs.

Figure 10:
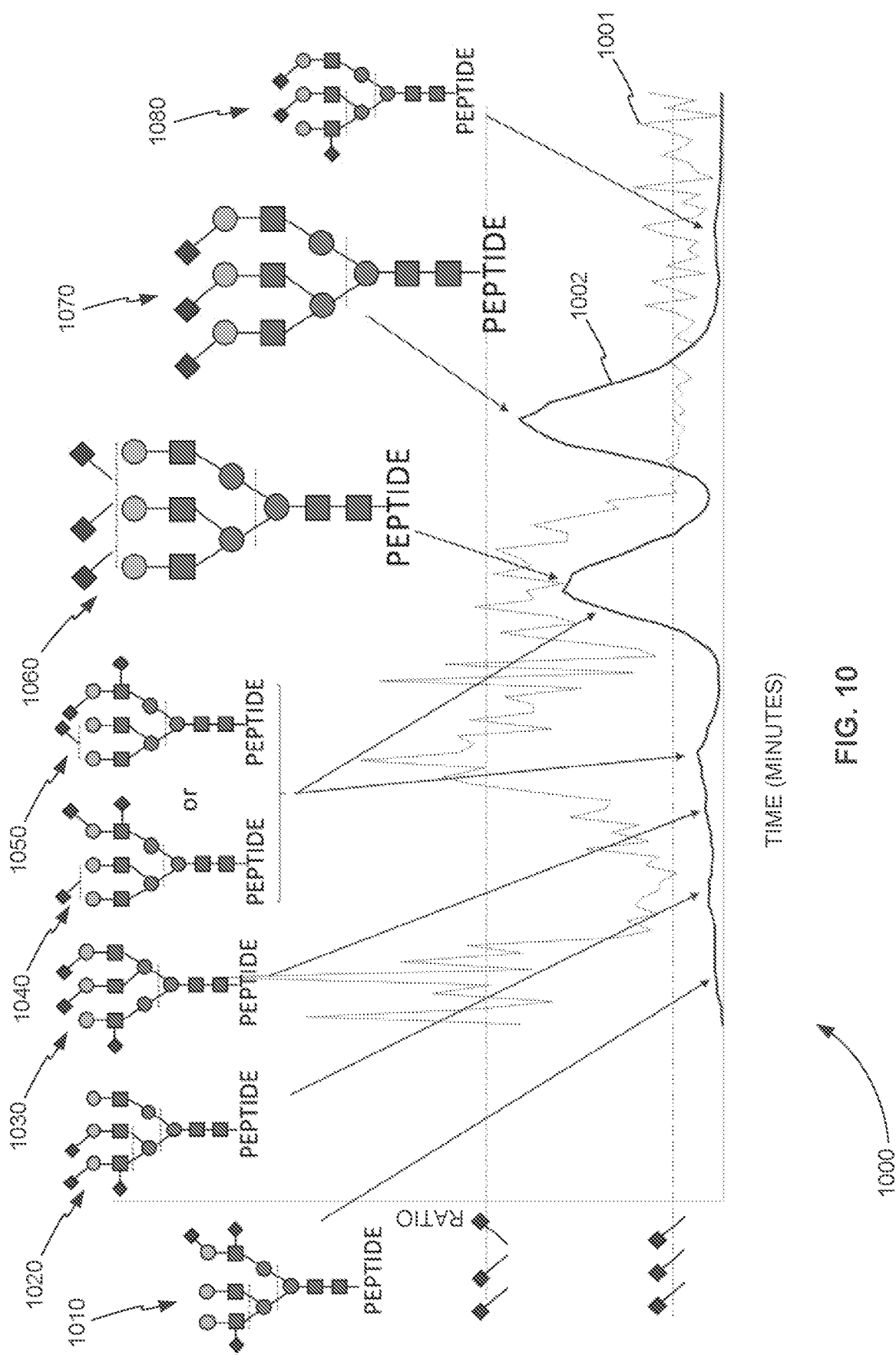
FIG. 10 is an exemplary plot of a precursor XIC superimposed on the ratio of intensities of two XICs found using ECD that shows isomers found using both ECD and CID, in accordance with various embodiments.

FIG. 10 is an exemplary plot 1000 of a precursor XIC superimposed on the ratio of intensities of two XICs found using ECD that shows isomers found using both ECD and CID, in accordance with various embodiments. FIG. 10 shows eight isomers 1010-1080 identified for a glycopeptide using both ECD and CID. More specifically, eight different sialic acid to sugar linkages are identified for isomers 1010-1080.

The glycan of the glycopeptide of FIG. 10 includes three antennae, three Gal sugars, and three sialic acids. A glycopeptide with the configuration of this glycan is referred to as an A3G3Sa3 glycopeptide.

The glycan of the glycopeptide of FIG. 10 is known, for example, to include linkages of sialic acid to Man in addition to linkages of sialic acid to Gal. As a result, CID is performed in addition to ECD. CID is used to identify linkages of sialic acid to Man.

ECD with an electron energy of 3 eV is used to produce ratio 1001 as described above. Precursor XIC 1002 is superimposed on ratio 1001 and both are used, as described above, to identify sialic acid to Gal linkages. By identifying sialic acid to Man using CID and by identifying sialic acid to Gal linkages using ECD, all eight isomers 1010-1080 are identified. Note that more than one isomer is identified for two precursor ion peaks of precursor XIC 1002.

System for Identifying Sialic Acid Linkages

Figure 11:
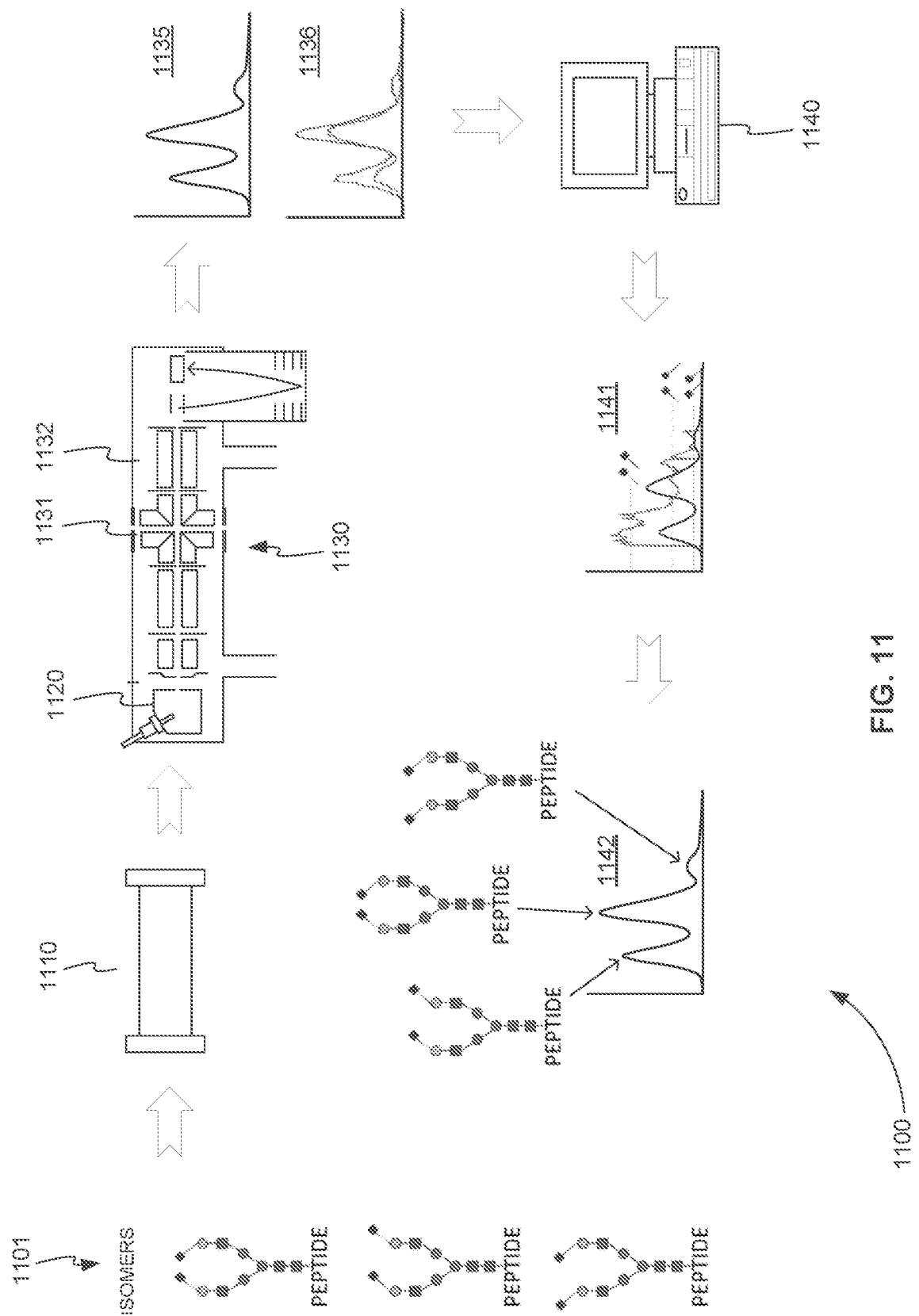
FIG. 11 is a schematic diagram of a system for identifying one or more linkages of a sialic acid to a glycan of an isomer of a glycopeptide using ECD and MRM precursor ion to product ion transitions, in accordance with various embodiments.

FIG. 11 is a schematic diagram 1100 of a system for identifying one or more linkages of a sialic acid to a glycan of an isomer of a glycopeptide using ECD and MRM precursor ion to product ion transitions, in accordance with various embodiments. The system of FIG. 11 includes separation device 1110, ion source 1120, tandem mass spectrometer 1130, and processor 1140.

Separation device 1110 separates one or more isomers 1101 of a glycopeptide from a sample. One or more isomers 1101 are digested from a glycoprotein, for example. Separation device 1110 can separate one or more isomers 1101 using any separation technique including, but not limited to, LC, CE, or IMS.

Ion source 1120 ionizes the one or more separated isomers, producing an ion beam that includes isomer ions of a precursor ion of the glycopeptide. Ion source 1120 is shown as performing electrospray ionization (ESI) (e.g., nanospray) but can be any type of ion source. Ion source 1120 is shown as part of tandem mass spectrometer 1130 but can also be a separate device.

Tandem mass spectrometer 1130 includes ECD device 1131 and CID device 1132. For each separation time of a plurality separation times, tandem mass spectrometer 1130 executes or monitors a first and a second group of MRM transitions using ECD device 1131 with an electron energy of 2-5 eV. The first group of one or more MRM transitions is selected so that each transition includes the precursor ion and a product ion known to be enhanced or suppressed for a first linkage of a sialic acid of the glycopeptide to a glycan. The second group of one or more MRM transitions is selected so that each transition includes the precursor ion and a product ion known to be enhanced or suppressed for a second linkage of the sialic acid of the glycopeptide to the glycan. Precursor XIC 1135 is produced for the precursor ion. An XIC is produced for each product ion of the first and second groups as shown in plot 1136.

Processor 1140 is in communication with separation device 1110, ion source 1120, and tandem mass spectrometer 1130. Processor 1140 performs a number of steps. A. Processor 1140 calculates a separation time of an isomer of one or more separated isomers 1101 from a peak of precursor XIC 1135. B. Processor 1140 sums product ion intensities of the first group at the separation time producing a first sum and sums product ion intensities of the second group at the separation time producing a second sum using XICs of the first and second groups. C. Processor 1140 calculates a ratio of the first sum to the second sum. D. Processor 1140 compares the ratio at the separation time to predetermined ratio ranges that each corresponds to a combination of a selection from a set of the first linkage and the second linkage taken one or more times (plot 1141). The one or more times correspond to the number of one or more sialic acids known to be included in the glycopeptide. E. Processor 1140 identifies one or more linkages of the sialic acid to the glycan of the isomer from the combination found to match the ratio in the comparison. In other words, one or more linkages of the sialic acid to the glycan are identified for each peak of the precursor XIC as shown in plot 1142.

In various embodiments, the sialic acid includes Neu5Ac, the glycan includes Gal, the first linkage includes Neu5Ac-alpha (2,6) to Gal ($\alpha 2,6$) and the second linkage includes Neu5Ac-alpha (2,3) to Gal ($\alpha 2,3$).

In various embodiments, the sialic acid includes Neu5Gc and the glycan includes Man.

In various embodiments, tandem mass spectrometer 1130 fragments the precursor ion of the first group of transitions and the second group of transitions using ECD device 1131 with an electron energy of 3 eV.

In various embodiments, the one or more transitions of the first group can include a product ion of 676.5 m/z, product ions of 676.5, 677.5, and 678.5 m/z, product ions of 838.3, 839.3 and 840.3 m/z, or product ions of 676.5, 677.5, 678.5, 838.3, 839.3, and 840.3 m/z.

In various embodiments, the one or more transitions of the second group can include a product ion of 292.1 m/z, product ions of 292.1, 293.1, and 294.1 m/z, product ions of 274.1, 275.1, and 276.1 m/z, or product ions of 274.1, 275.1, 276.1, 292.1, 293.1, and 294.1 m/z.

In various embodiments, in step B, processor 1140 sums a moving average of product ion intensities of the first group at the separation time producing the first sum and sums a moving average of product ion intensities of the second group at the separation time producing the second sum using XICs of the first and second groups.

In various embodiments, processor 1140 further calculates a separation time of a second isomer of the one or more separated isomers from a second peak of precursor XIC 1135 and performs steps B-E for the second isomer to identify one or more linkages of the sialic acid to glycan of the second isomer.

In various embodiments, processor 1140 calculates a first quantity of the isomer from the separation time of the first isomer and precursor XIC 1135 and a second quantity of the second isomer from the separation time of the second isomer and precursor XIC 1135. Processor 1140 further calculates a ratio of the first quantity to the second quantity. Processor 1140 provides a diagnosis of a pathophysiological process based on the ratio, the identified one or more linkages of the sialic acid to the glycan of the isomer, and the identified one or more linkages of the sialic acid to the glycan of the second isomer.

In various embodiments, the pathophysiological process can include, but is not limited to, one or more of a viral infection, embryogenesis, inflammation, a cardiovascular disease, a cancer, or a neural development condition.

In various embodiments, tandem mass spectrometer 1130 further, for each separation time of the plurality of separation times, using CID device 1132, executes on the ion beam a third group of one or more MRM transitions. An XIC is produced for each product ion of the third group. Processor 1140 further identifies one or more linkages of the sialic to another glycan of the isomer from XICs of the third group.

In various embodiments, processor 1140 is used to control or provide instructions to separation device 1110, ion source 1120, and tandem mass and to analyze data collected. Processor 1140 controls or provides instructions by, for example, controlling one or more voltage, current, or pressure sources (not shown). Processor 1140 can be a separate device as shown in FIG. 11 or can be a processor or controller of one or more devices of tandem mass spectrometer 1130, for example. Processor 1140 can be, but is not limited to, a controller, a computer, a microprocessor, the computer system of FIG. 1, or any device capable of sending and receiving control signals and data.

Method for Identifying Sialic Acid Linkages

Figure 12:
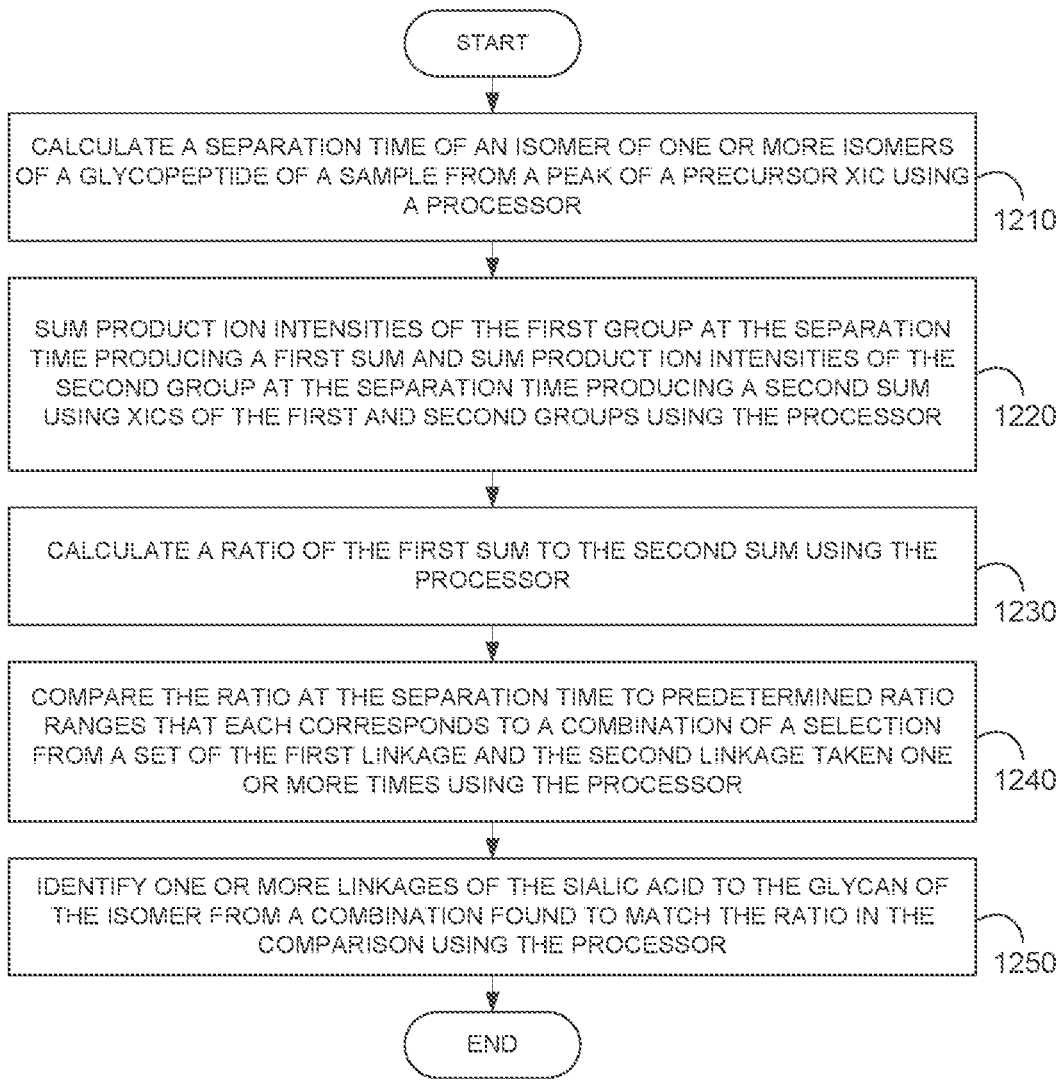
FIG. 12 is a flowchart showing a method for identifying one or more linkages of a sialic acid to a glycan of an isomer of a glycopeptide using ECD and MRM precursor ion to product ion transitions, in accordance with various embodiments.

FIG. 12 is a flowchart showing a method 1200 for identifying one or more linkages of a sialic acid to a glycan of an isomer of a glycopeptide using ECD and MRM precursor ion to product ion transitions, in accordance with various embodiments.

In step 1210 of method 1200, a separation time of an isomer of one or more isomers of a glycopeptide of a sample is calculated from a peak of a precursor XIC using a processor. The one or more isomers are separated from the sample using a separation device. The one or more separated isomers are ionized using an ion source, producing an ion beam that includes isomer ions of a precursor ion of the glycopeptide. For each separation time of a plurality separation times, using an ECD device with 2-5 eV electrons, a first and second group of one or more MRM transitions are monitored or executed on the ion beam. Each transition of the first group of one or more MRM transitions includes the precursor ion and a product ion known to be enhanced or suppressed for a first linkage of a sialic acid of the glycopeptide to a glycan of the glycopeptide. Each transition of the second group of one or more MRM transitions includes the precursor ion and a product ion known to be enhanced or suppressed for a second linkage for the sialic acid to the glycan. The precursor XIC is produced for the precursor ion and an XIC is produced for each product ion of the first and second groups.

In step 1220, product ion intensities of the first group are summed at the separation time producing a first sum and product ion intensities of the second group are summed at the separation time producing a second sum using XICs of the first and second groups using the processor.

In step 1230, a ratio of the first sum to the second sum is calculated using the processor.

In step 1240, the ratio at the separation time is compared to predetermined ratio ranges that each corresponds to a combination of a selection from a set of the first linkage and the second linkage taken one or more times using the processor. The one or more times correspond to one or more sialic acids known to be included in the glycopeptide.

In step 1250, one or more linkages of the sialic acid to the glycan of the isomer are identified from a combination found to match the ratio in the comparison using the processor.

Computer Program Product for Identifying Sialic Acid Linkages

In various embodiments, computer program products include a tangible computer-readable storage medium whose contents include a program with instructions being executed on a processor so as to perform a method for identifying one or more linkages of a sialic acid to a glycan of an isomer of a glycopeptide using ECD and MRM precursor ion to product ion transitions. This method is performed by a system that includes one or more distinct software modules.

Figure 13:
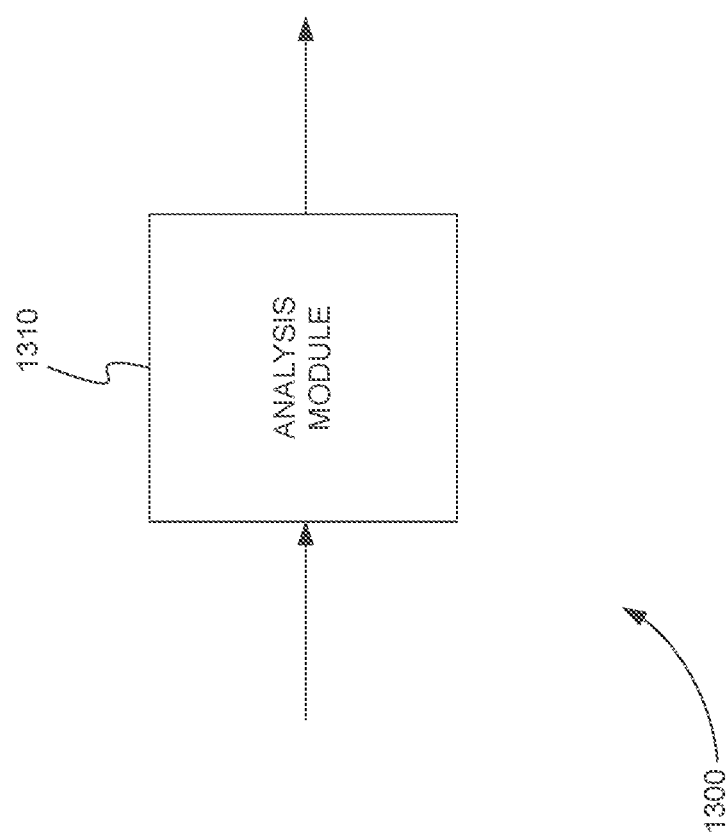
FIG. 13 is a schematic diagram of a system that includes one or more distinct software modules that perform a method for identifying one or more linkages of a sialic acid to a glycan of an isomer of a glycopeptide using ECD and MRM precursor ion to product ion transitions, in accordance with various embodiments.

FIG. 13 is a schematic diagram of a system 1300 that includes one or more distinct software modules that perform a method for identifying one or more linkages of a sialic acid to a glycan of an isomer of a glycopeptide using ECD and MRM precursor ion to product ion transitions, in accordance with various embodiments. System 1300 includes an analysis module 1310.

Analysis module 1310 calculates a separation time of an isomer of one or more isomers of a glycopeptide of a sample from a peak of a precursor XIC. The one or more isomers are separated from the sample using a separation device. The one or more separated isomers are ionized using an ion source, producing an ion beam that includes isomer ions of a precursor ion of the glycopeptide. For each separation time of a plurality separation times, using an ECD device with 2-5 eV electrons, a first and second group of one or more MRM transitions are monitored or executed on the ion beam. Each transition of the first group of one or more MRM transitions includes the precursor ion and a product ion known to be enhanced or suppressed for a first linkage of a sialic acid of the glycopeptide to a glycan of the glycopeptide. Each transition of the second group of one or more MRM transitions includes the precursor ion and a product ion known to be enhanced or suppressed for a second linkage for the sialic acid to the glycan. The precursor XIC is produced for the precursor ion and an XIC is produced for each product ion of the first and second groups.

Analysis module 1310 sums product ion intensities of the first group at the separation time producing a first sum and sums product ion intensities of the second group at the separation time, producing a second sum using XICs of the first and second groups. Analysis module 1310 calculates a ratio of the first sum to the second sum. Analysis module 1310 compares the ratio at the separation time to predetermined ratio ranges that each corresponds to a combination of a selection from a set of the first linkage and the second linkage taken one or more times. The one or more times correspond to one or more sialic acids known to be included in the glycopeptide. Finally, analysis module 1310 identifies one or more linkages of the sialic acid to the glycan of the isomer from a combination found to match the ratio in the comparison.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A system for identifying one or more linkages of a sialic acid (SA) to a glycan of a glycopeptide using electron capture dissociation (ECD) and multiple reaction monitoring (MRM) precursor ion to product ion transitions, comprising:

a separation device that separates one or more isomers of a glycopeptide from a sample;

an ion source that ionizes the one or more separated isomers, producing an ion beam that includes isomer ions of a precursor ion of the glycopeptide;

a tandem mass spectrometer that, for each separation time of a plurality separation times, using an ECD device with 2-5 eV electrons, executes on the ion beam a first group of one or more MRM transitions that each includes the precursor ion and a product ion known to be enhanced or suppressed for a first linkage of an SA of the glycopeptide to a glycan of the glycopeptide and a second group of one or more MRM transitions that each includes the precursor ion and a product ion known to be enhanced or suppressed for a second linkage for the SA to the glycan, producing an extracted ion chromatogram (XIC) for the precursor ion and an XIC for each product ion of the first and second groups; and a processor in communication with the tandem mass spectrometer that
a. calculates a separation time of an isomer of the one or more separated isomers from a peak of the XIC,
b. sums product ion intensities of the first group at the separation time producing a first sum and sums product ion intensities of the second group at the separation time producing a second sum using XICs of the first and second groups,
c. calculates a ratio of the first sum to the second sum,
d. compares the ratio at the separation time to predetermined ratio ranges that each corresponds to a combination of a selection from a set of the first linkage and the second linkage taken one or more times, wherein one or more times correspond to one or more SAs known to be included in the glycopeptide, and
e. identifies one or more linkages of the SA to the glycan of the isomer from a combination found to match the ratio in the comparison.

2. The system of claim 1, wherein the SA comprises N-acetylneuraminic acid (Neu5Ac).

3. The system of claim 2, wherein the glycan comprises galactose (Gal).

4. The system of claim 3, wherein the first linkage comprises Neu5Ac-alpha (2,6) to Gal ($\alpha$2,6) and the second linkage comprises Neu5Ac-alpha (2,3) to Gal ($\alpha$2,3).

5. The system of claim 1, wherein the SA comprises N-glycolylneuraminic acid (Neu5Gc).

6. The system of claim 2, wherein the glycan comprises mannose (Man).

7. The system of claim 1, wherein the tandem mass spectrometer fragments the precursor ion of the first group of transitions and the second group of transitions using the ECD device with 3 eV electrons.

8. The system of claim 1, wherein the first group comprises one or more MRM transitions that include a product ion of 676.5 m/z.

9. The system of claim 1, wherein the first group comprises one or more MRM transitions that include product ions of 676.5, 677.5, and 678.5 m/z.

10. The system of claim 1, wherein the first group comprises one or more MRM transitions that include product ions of 838.3, 839.3 and 840.3 m/z.

11. The system of claim 1, wherein the first group comprises one or more MRM transitions that include product ions of 676.5, 677.5, 678.5, 838.3, 839.3, and 840.3 m/z.

12. The system of claim 1, wherein the second group comprises one or more MRM transitions that include a product ion of 292.1 m/z.

13. The system of claim 1, wherein the second group comprises one or more MRM transitions that include product ions of 292.1, 293.1, and 294.1 m/z.

14. The system of claim 1, wherein the second group comprises one or more MRM transitions that include product ions of 274.1, 275.1, and 276.1 m/z.

15. The system of claim 1, wherein the second group comprises one or more MRM transitions that include product ions of 274.1, 275.1, 276.1, 292.1, 293.1, and 294.1 m/z.

16. The system of claim 1, wherein, in step b, the processor sums a moving average of product ion intensities of the first group at the separation time producing the first sum and sums a moving average of product ion intensities of the second group at the separation time producing the second sum using XICs of the first and second groups.

17. The system of claim 1, wherein the processor further calculates a separation time of a second isomer of the one or more separated isomers from a second peak of the XIC for precursors and performs steps b-e for the second isomer to identify one or more linkages of the SA to the glycan of the second isomer.

18. The system of claim 9, wherein the processor further calculates a first quantity of the isomer from the separation time of the first isomer and the XIC for precursors and a second quantity of the second isomer from the separation time of the second isomer and the XIC for precursors.

19. The system of claim 10, wherein the processor further calculates a ratio of the first quantity to the second quantity and provides a diagnosis of a pathophysiological process based on the ratio, the identified one or more linkages of the SA to the glycan of the isomer, and the identified one or more linkages of the SA to the glycan of the second isomer.

20. The system of claim 11, wherein the pathophysiological process comprises one or more of a viral infection, embryogenesis, inflammation, a cardiovascular disease, a cancer, or a neural development condition.

21. The system of claim 1, wherein the tandem mass spectrometer further, for each time of the plurality times, using a collision-induced dissociation (CID) device, executes on the ion beam a third group of one or more MRM transitions, producing an extracted ion chromatogram (XIC) for each product ion of the third group and wherein the processor further identifies one or more linkages of the SA to another glycan of the isomer from XICs of the third group.

22. A method for identifying one or more linkages of a sialic acid (SA) to a glycan of an isomer of a glycopeptide using electron capture dissociation (ECD) and multiple reaction monitoring (MRM) precursor ion to product ion transitions, comprising:

calculating a separation time of an isomer of one or more isomers of a glycopeptide of a sample from a peak of an extracted ion chromatogram (XIC) using a processor, wherein the one or more isomers are separated from the sample using a separation device, the one or more separated isomers are ionized using an ion source, producing an ion beam that includes isomer ions of a precursor ion of the glycopeptide, and for each separation time of a plurality separation times, using an ECD device with 2-5 eV electrons, a first group of one or more MRM transitions that each includes the precursor ion and a product ion known to be enhanced or suppressed for a first linkage of an SA of the glycoprotein to a glycan of the glycopeptide and a second group of one or more MRM transitions that each includes the precursor ion and a product ion known to be enhanced or suppressed for a second linkage for the SA to the glycan are executed on the ion beam, producing the XIC for the precursor ion and an XIC for each product ion of the first and second groups;

summing product ion intensities of the first group at the separation time producing a first sum and summing product ion intensities of the second group at the separation time producing a second sum using XICs of the first and second groups using the processor;

calculating a ratio of the first sum to the second sum using the processor;

comparing the ratio at the separation time to predetermined ratio ranges that each corresponds to a combination of a selection from a set of the first linkage and the second linkage taken one or more times using the processor, wherein one or more times correspond to one or more SAs known to be included in the glycopeptide; and identifying one or more linkages of the SA to the glycan of the isomer from a combination found to match the ratio in the comparison using the processor.

23. A computer program product, comprising a non-transitory and tangible computer-readable storage medium whose contents include a program with instructions being executed on a processor to perform a method for identifying one or more linkages of a sialic acid (SA) to a glycan of an isomer of a glycopeptide using electron capture dissociation (ECD) and multiple reaction monitoring (MRM) precursor ion to production transitions, the method comprising:

providing a system, wherein the system comprises one or more distinct software modules, and wherein the distinct software modules comprise an analysis module;

calculating a separation time of an isomer of one or more isomers of a glycopeptide of a sample from a peak of an XIC using the analysis module, wherein the one or more isomers are separated from the sample using a separation device, the one or more separated isomers are ionized using an ion source, producing an ion beam that includes isomer ions of a precursor ion of the glycopeptide, and for each separation time of a plurality separation times, using an ECD device with 2-5 eV electrons, a first group of one or more MRM transitions that each includes the precursor ion and a production known to be enhanced or suppressed for a first linkage of an SA of the glycoprotein to a glycan of the glycopeptide and a second group of one or more MRM transitions that each includes the precursor ion and a product ion known to be enhanced or suppressed for a second linkage for the SA to the glycan are executed on the ion beam, producing the XIC for the precursor ion and an XIC for each product ion of the first and second groups;

summing product ion intensities of the first group at the separation time producing a first sum and summing product ion intensities of the second group at the separation time producing a second sum using XICs of the first and second groups using the analysis module;

calculating a ratio of the first sum to the second sum using the analysis module;

comparing the ratio at the separation time to predetermined ratio ranges that each corresponds to a combination of a selection from a set of the first linkage and the second linkage taken one or more times using the analysis module, wherein one or more times correspond to one or more SAs known to be included in the glycopeptide; and identifying one or more linkages of the SA to the glycan of the isomer from a combination found to match the ratio in the comparison using the analysis module.

* * * * *